Patented June 28, 1938

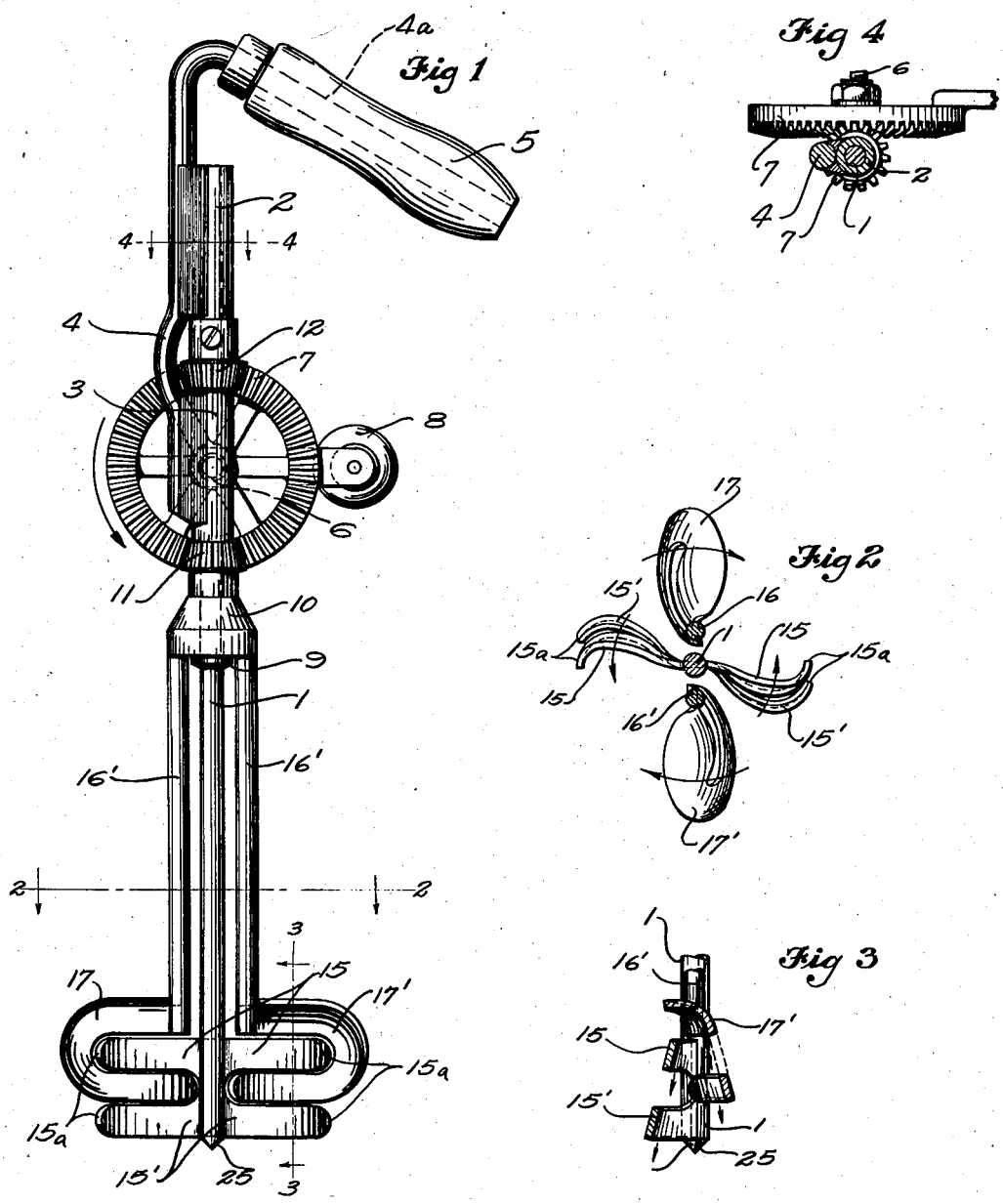

2,121,918

UNITED STATES PATENT OFFICE 2,121,918

BEATER

Elroy Homer Leighty, Seattle, Wash.

Application May 24, 1937, Serial No. 144,454

2 Claims. (Cl. 259—132)

This invention relates to improvements in beaters, and has reference more particularly to hand operated or motor driven means for beating eggs, dressings, batter, cream, and the like; and the principal object of the invention is to provide a beater that is easily operated by hand, easy to clean and keep in a sanitary condition; that is durable in use, relatively inexpensive, and which is very effective for a quick beating or whipping up of such products as those above mentioned and others not mentioned.

It is a still further object of this invention to provide a beater wherein two sets of beater vanes are mounted for rotation about a common axis, and which vanes of the two sets are given novel, and different shapes which result in an opposing action that is most effective for quick and effective beating; said vanes being arranged for passage each through the other incident to rotation in opposite directions, with those of one set cupped in a manner to effect a downward driving of the material being beaten, thus to eliminate splashing and cause an inward flow of material to the beater vanes.

Still further objects of the invention reside in the details of construction and in the combination of parts, particularly the beater vanes, as will hereinafter be described.

In accomplishing these and other objects, I have provided the improved details of construction, the preferred forms of which are illustrated in the accompanying drawing, wherein—

Fig. 1 is a side view of a beater embodied by the present invention.

Fig. 2 is a cross section of the same, taken in the horizontal plane of the line 2—2 in Fig. 1, particularly showing the shaping of the two sets of beater vanes.

Fig. 3 is a cross section in the vertical plane of the line 3—3 in Fig. 1, showing inclination of the vanes of different sets.

Fig. 4 is a cross section on line 4—4 in Fig. 1.

While it is known to be old in the art to provide beaters with beater blades, vanes, etc., revolving in opposite directions, it is believed new to provide them in the specific formation and relationship which will hereinafter be described.

Referring more in detail to the drawing—

The present beater comprises a central or main beater shaft 1, with its upper end portion revolubly mounted in spaced bearing sleeves 2 and 3, which are joined rigidly together and in spaced relation by a connecting rod 4, which, as seen in Fig. 1, may be welded or otherwise suitably fixed thereto, and which extends beyond the shaft 1 and the bearing 2 at its upper end and has that portion designated at 4a bent laterally and downwardly and equipped with a handle portion 5 to facilitate use of the device.

Fixed to the side of bearing 3 is a laterally extending stud 6 on which a bevel gear wheel 7 is revolubly mounted. The gear has a handle 8 fixed thereon, whereby it may be manually rotated and, as shown in Figs. 1 and 4, the gear 7 is supported in a plane that is parallel to the axis of the shaft 1.

Fixed to the shaft 1, between the bearings 2 and 3, is a beveled gear pinion 12 operatively in mesh with the gear wheel 7. Therefore, when the gear 7 is rotated, it effects, by reason of gear 12, a rotation of the shaft 1.

Revolubly mounted on the shaft 1, just below the lower end of bearing sleeve 3 and supported against longitudinal slipping by a collar 9 that is formed on the shaft 1, is a cross head bearing 10, equipped with a beveled gear pinion 11, operatively in mesh with the gear wheel 7 so that the cross head will be revolubly driven when the gear wheel 7 is rotated, but in a direction opposite to the rotation of the gear wheel 12 and shaft 1.

Fixed to the lower end portion of the shaft 1 and extending radially in opposite directions therefrom are beater vanes 15 and 15'. Each of these vanes is longitudinally bifurcated, as shown best in Fig. 1, and the prongs 15a that are formed by reason of the bifurcation are spaced apart and each is hooked forwardly at its outer end toward its direction of rotation, as indicated by the arrows in Fig. 2, so as to draw in the material and impel it toward the central axis of the beater rather than away from the center. Also, the upper prong of the vane at each side of the shaft is further advanced than the lower vane, and both are set in a plane that is inclined relative to the axis of rotation so as to cause a downward driving action of the material, as indicated by the arrows in Fig. 3. The relationship of the vanes 15 and 15' is shown best in Fig. 2, and the inclined relationship is seen in Fig. 3.

Fixed to the opposite ends of the cross head bearing 10, and spaced from and depending downwardly along the shaft 1, are rods 16—16' which terminate just above the beater vanes 15—15', and each rod has a beater vane 17 fixed to the lower end thereof.

The vanes 17—17', which are fixed to the lower ends of the rods 16, are of a sort of spoon shaped formation, and are rounded about their outer end edges and are bifurcated and supported in such manner that the upper prongs of the bifurcated vanes 15 will pass between the spaced leg portions incident to their rotation in opposite directions. Each of the vanes 17 has its top longitudinal edge portion bent forwardly and in the direction of rotation, to act as a sort of scooping edge for the downward deflection of the material. These vanes also are longer than the vanes 15 and are cupped in the direction of rotation, which, in the use of the device, is opposite to that of the vanes 15, so that the two sets of vanes will have a cooperative opposing action, which facilitates the beating operation.

As shown best in Fig. 3, the vanes 17 have their lower portions in a plane inclined relative to the axis of rotation, and oppositely to the plane of inclination of the vanes 15, thus to effect a better beating action by reason of the opposed relationship.

As will be observed by reference to Fig. 1, the lower end of the shaft 1 terminates in a point, as at 25, and in use of the device, the operator places this point against the bottom of the dish or pan, holds the device steady by means of the handle 5; then rotates the gear wheel 7 by means of the handle 8, in the direction of the arrow in Fig. 1. This rotation of gear 7 effects an opposite rotative action of the shaft 1, and the cross head 10, so that the two sets of beater vanes rotate in opposite directions, and in so doing, pass one within the other to effect the beating of material.

It will be understood by reference to the showing in Fig. 2, that the vanes 17 will operate to scoop up the material and drive it downwardly and inwardly, and the beaters 15 will hook into the material and throw it toward the center axis of the beater, and also downwardly, and since the two sets of beaters move in opposed relation to each other, a quick and effective beating action will be the result.

It is also apparent that, by reason of the spacing of the rods 16 from the central shaft and by placing the cross head 10 far up on shaft 1 away from the beater vanes, it will be easy to clean the parts and keep them in a sanitary condition.

Devices of this character may be made in various sizes, according to the particular use or need and without departing from the spirit of the invention.

While the present specification and drawing describe and illustrate a hand operated machine, it is the intention that it be applied also to motor driven or mechanically driven devices of various kinds and the claims are understood to be construed in this light.

Having thus described my invention, what I claim as new therein and desire to secure by Letters Patent is—

1. In a beater, a central beater shaft, beater vanes fixed on the lower end portion of the shaft and extending radially therefrom; said blades being longitudinally bifurcated to provide two spaced prongs that are hooked forwardly in the direction of rotation, a cross head bearing revoluble on the said central shaft at a distance substantially above the said vanes, means operable for rotating the shaft and cross head in opposite directions, a pair of rods fixed to the cross head and depending along opposite sides of said shaft and spaced therefrom, beater vanes fixed to the lower ends of said rods and extending radially of the axis of rotation beyond the first vanes and cupped toward the direction of rotation and in a manner to effect an inward and downward propulsion of material acted on and slotted for passage of prongs of the first mentioned vanes therethrough incident to opposite rotation of the vanes.

2. A device as in claim 1 wherein the first mentioned vanes are disposed flatwise relative to the line of rotation and inclined relative to the axial direction of the beater.

ELROY HOMER LEIGHTY.